(12) United States Patent
Bourakov et al.

(10) Patent No.: US 9,438,361 B2
(45) Date of Patent: *Sep. 6, 2016

(54) INTERACTIVE CONTENT DELIVERY SYSTEM AND APPARATUS WITH GLOBAL REACH CAPABILITY

(71) Applicants: Eugene Bourakov, Carmel, CA (US); Johnathan C. Mun, Pleasanton, CA (US); Veniamin Bourakov, Fremont, CA (US)

(72) Inventors: Eugene Bourakov, Carmel, CA (US); Johnathan C. Mun, Pleasanton, CA (US); Veniamin Bourakov, Fremont, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/809,075

(22) Filed: Jul. 24, 2015

(65) Prior Publication Data

US 2015/0339719 A1  Nov. 26, 2015

Related U.S. Application Data

(63) Continuation of application No. 13/933,644, filed on Jul. 2, 2013, now Pat. No. 9,118,429.

(51) Int. Cl.
| | |
|---|---|
| *H04Q 7/10* | (2006.01) |
| *H04H 20/61* | (2008.01) |
| *G06Q 30/02* | (2012.01) |
| *H04W 4/02* | (2009.01) |
| *H04L 29/08* | (2006.01) |

(52) U.S. Cl.
CPC .............. *H04H 20/61* (2013.01); *G06Q 30/02* (2013.01); *G06Q 30/0241* (2013.01); *H04L 67/04* (2013.01); *H04L 67/10* (2013.01); *H04W 4/023* (2013.01); *H04L 67/20* (2013.01)

(58) Field of Classification Search
CPC ......... H04W 4/12; H04W 4/14; H04W 4/18; H04W 4/023
USPC ....................... 455/456.3, 456.1, 414.1, 420
See application file for complete search history.

*Primary Examiner* — Patrick Edouard
*Assistant Examiner* — Julio Perez
(74) *Attorney, Agent, or Firm* — James M. Smedley LLC; James Michael Smedley, Esq.

(57) ABSTRACT

In a method for providing a content service to a recipient (20) in communications, a service center (14) receives information on a recipient identification and on service terminals (16) assigned, in a sender device (38), for the content. The service center (14) uploads the content to the assigned service terminals (16). The service terminal (16) receives information on a location of a transmitter device (34) of the recipient (20). The service terminal (16) compares the received location information with location information on the service terminal (16). Based on the comparing, if the service terminal is in a close proximity of the transmitter device (34) of the recipient (20) the service terminal (16) activates a first display content for inviting the service terminal (16) to display the uploaded content on a monitor of the service terminal (16). When the recipient acknowledges the first display content, the service terminal may take actions related to a second display content.

23 Claims, 9 Drawing Sheets

INTERACTIVE CONTENT DELIVERY SYSTEM AND APPARATUS WITH GLOBAL REACH CAPABILITY

CROSS-REFERENCE TO RELATED APPLICATIONS

This application is a continuation of and claims benefit of priority to the following non-provisional utility patent application which is hereby incorporated by reference in its entirety: U.S. patent application Ser. No. 13/933,644, filed Jul. 2, 2013.

FIELD OF THE INVENTION

The exemplary and non-limiting embodiments of this invention relate generally to wireless communications networks, and more particularly to providing a personalized greeting and advertisement content service in a communications system.

BACKGROUND OF THE INVENTION

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

Traditionally, advertising is a form of communication used to persuade viewers, readers or listeners to take some action with respect to products, ideas, or services. Advertising messages are usually paid for by sponsors and viewed via various media, including traditional media such as newspapers, magazines, television, radio, outdoor or direct mail, or new media such as websites and text messages. In 2010, the amount of money spent on advertising was estimated to be more than $300 billion in the United States, and $500 billion worldwide, which confirms the importance of such communication. As a result, a problem is that the price of advertisements addressing a vast audience is becoming incredibly high and practically inaccessible for individual advertisers.

BRIEF DESCRIPTION OF THE INVENTION

The following presents a simplified summary of the invention in order to provide a basic understanding of some aspects of the invention. This summary is not an extensive overview of the invention. It is not intended to identify key elements of the invention or to delineate the scope of the invention. Its sole purpose is to present some concepts of the invention in a simplified form as a prelude to the more detailed description that is presented later.

Various aspects of the invention comprise methods and apparatuses as defined in the independent claims. Further embodiments of the invention are disclosed in the dependent claims.

An aspect of the invention relates to a method of providing a content service to a recipient in a communications system, wherein the method comprises receiving information on a recipient identification in a service terminal apparatus assigned, in a sender device, for the content service; uploading the content service to the assigned service terminal apparatus; receiving, in the service terminal apparatus, information on the recipient identification received from a transmitter device of the recipient by a receiver device of the service terminal apparatus; comparing location information on the service terminal apparatus with location information of the receiver device which received the recipient identification from the transmitter device of the recipient; wherein if, based on the comparing, it is detected that the service terminal apparatus is the service terminal apparatus the receiver device of which received the recipient identification from the transmitter device of the recipient, the method comprises activating the content service in the service terminal apparatus for inviting the service terminal apparatus to display the uploaded content service on a monitor of the service terminal apparatus.

A further aspect of the invention relates to a method of providing a content service to a recipient in a communications system, wherein the method comprises receiving information on a recipient identification in a service terminal apparatus assigned, in a sender device, for the content service; uploading the content service to the assigned service terminal apparatus; receiving, in the service terminal apparatus, information on a location of a transmitter device of the recipient; comparing the received location information with location information on the assigned service terminal apparatus; if, based on the comparing, the service terminal apparatus identifies that the recipient is in a close proximity of the service terminal apparatus, the method comprises activating the content service in the service terminal apparatus for inviting the service terminal apparatus to display the uploaded content service on a monitor of the service terminal apparatus.

A still further aspect of the invention relates to a method of providing a content service to a recipient in a communications system, wherein the method comprises receiving information on a time schedule in a service terminal apparatus assigned, in a sender device, for the content service; uploading the content service to the assigned service terminal apparatus; based on the received time schedule, activating the content service in the service terminal apparatus for inviting the service terminal apparatus to display the uploaded content service on a monitor of the service terminal apparatus.

A still further aspect of the invention relates to a service center apparatus configured to receive information on a recipient identification and one or more service terminal apparatuses assigned, by a sender device, for a content service; upload the content service to the one or more assigned service terminal apparatuses; transmit the received information on the recipient identification to the one or more assigned service terminal apparatuses.

A still further aspect of the invention relates to a service center apparatus configured to receive information on a recipient identification and one or more service terminal apparatuses assigned, in a sender device, for a content service; upload the content service to the one or more assigned service terminal apparatuses; receive information on a location of a transmitter device of the recipient; transmit the information on the location of the transmitter device of the recipient to the same service terminal apparatus where the content service for the recipient identification was uploaded.

A still further aspect of the invention relates to a service center apparatus configured to receive information on a time schedule and one or more service terminal apparatuses assigned, in a sender device, for a content service; upload the content service to the one or more assigned service terminal apparatuses; transmit the received time schedule to the one or more assigned service terminals apparatuses.

A still further aspect of the invention relates to a service center apparatus configured to upload a content service based on an upload content service message received from a service center apparatus; receive information on a recipient identification received, from a transmitter device of a recipient, by a receiver device of the service terminal apparatus; compare location information on the service terminal apparatus with location information of the receiver device which received the recipient identification from the transmitter device of the recipient; wherein if, based on the comparing, it is detected that the service terminal apparatus is the service terminal apparatus the receiver device of which received the recipient identification from the transmitter device of the recipient, the service terminal apparatus is configured to activate the content service for inviting the service terminal apparatus to display the uploaded content service on a monitor of the service terminal apparatus.

A still further aspect of the invention relates to a service terminal apparatus configured to upload a content service based on an upload content service message received from a service center apparatus; receive information on a location of a transmitter device of a recipient; compare the received location information with location information of the service terminal apparatus; if, based on the comparing, the service terminal apparatus identifies that the recipient is in a close proximity of the service terminal apparatus, the service terminal apparatus is configured to activate the content service in the service terminal apparatus for inviting the service terminal apparatus to display the uploaded content service on a monitor of the service terminal apparatus.

A still further aspect of the invention relates to a service terminal apparatus configured to receive information on a time schedule for a content service; upload the content service based on an upload content service message received from a service center apparatus; activate, based on the received time schedule, the content service in the service terminal apparatus for inviting the service terminal apparatus to display the uploaded content service on a monitor of the service terminal apparatus.

A still further aspect of the invention relates to a service terminal apparatus configured to upload a content service based on an upload content service message received from a service center apparatus; receive information that the recipient is in a close proximity of the service terminal apparatus, the service terminal apparatus is configured to activate interactive two-steps message content delivery in the service terminal apparatus for inviting the service terminal apparatus to display the uploaded content on a monitor of the service terminal apparatus on the first step, and after service terminal recognizes change in movement (e.g., a slow-down of the person, specific body gestures, and such) or facial pattern recognition, or obtains, interprets, and executes voice confirmation that message content is acquired by recipient, the second step of message content delivery is employed to display the remaining parts of message content being uploaded to the service terminal as a said two-steps message content delivery.

A still further aspect of the invention relates to the service terminal apparatus configured to upload a content service based on interactive two-steps message content delivery when the second step of message content is provided either as a pre-recorded content based on predicted recipient's reaction on the content displayed at the first step, or as a two-way live video/voice interaction.

BRIEF DESCRIPTION OF THE DRAWINGS

In the following the invention will be described in greater detail by means of exemplary embodiments with reference to the attached drawings, in which.

DETAILED DESCRIPTION OF SOME EMBODIMENTS

An exemplary embodiment enables providing a greeting and advertisement system, and, more particularly, a way of global reach delivery of personalized greeting and advertisement content created by an individual. Thus, an exemplary embodiment enables emphasizing a further form of communication—interactive greeting messages. Unlike advertisement, greeting messages are addressed to an individual or to a small group of individuals, by using personalized messages. A "happy birthday" or a "welcome aboard" slogan that one may find at his/her workplace is an example of personalized greeting. This type of communication is usually inexpensive and distributed locally. Its importance lays in its very strong emotional content.

Utilization of big TV screens and/or flat computer monitors in public places has become a ubiquitous attribute of modern life. These big screens viewable from a relatively long distance are used to provide valuable information, frequently mixed with advertisement content. Typical places for such big screens include airports, shopping malls, sport arenas, etc.

In accordance with an exemplary embodiment, the new type of communication is employed based on a fusion of global reach-enabled media, personalized greeting and personalized advertisements, and globally distributed network of big screen computer monitors/terminals in public places, interconnected into a personalized greeting and advertisement system. This fusion makes personalized greeting and advertisement content possible to be viewable on any of globally distributed big screen computer monitor networks. The personalized greeting and advertisement system service may be made widely available and incomparably cheaper than traditional immense audience advertisements. Moreover, due to its personalized nature it is capable of involving an important emotional component attracting people to use it. The personalized greeting and advertisement system also is a great opportunity for small business advertisers, because it provides a quick, simple, and affordable way to reach potential customers at places where the terminals are installed, attractive for new media advertising since they may be located in public and populous areas: shopping malls, airports, schools and colleges, or just busy streets.

Exemplary embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Like reference numerals refer to like elements throughout.

The present invention is applicable to any user terminal, server, corresponding component, and/or to any communication system or any combination of different communication systems that support provision of a personalized content service. The communication system may be a fixed communication system or a wireless communication system or a communication system utilizing both fixed networks and wireless networks (including mobile wireless networks). The protocols used the specifications of communication systems, servers and user terminals, especially in wireless communication, develop rapidly. Such development may require extra changes to an embodiment. Therefore, all words and expressions should be interpreted broadly and they are intended to illustrate, not to restrict, the embodiment.

With reference to FIGS. 1 to 4, let us examine an example of a radio system to which embodiments of the invention can be applied. In this example, the radio system is based on GSM network elements. However, the invention described in these examples is not limited to the GSM radio communications systems but can also be implemented in other radio communications systems, such as LTE, UMTS (universal mobile telecommunications system), EDGE, WCDMA, Bluetooth network, WLAN or other mobile or wireless network. In an embodiment, the presented solution may be applied between user equipment belonging to different but compatible systems such as LTE and UMTS.

A general architecture of a communication system is illustrated in FIGS. 1 to 4. FIGS. 1 to 4 illustrate a simplified system architecture only showing some elements and functional entities, all being logical units whose implementation may differ from what is shown. The connections shown in FIGS. 1 to 4 are logical connections; the actual physical connections may be different. It is apparent to a person skilled in the art that the systems also comprise other functions and structures. It should be appreciated that the functions, structures, elements, and protocols used in or for wireless communication are irrelevant to the actual invention. Therefore, they need not be discussed in more detail here.

Figure 1:
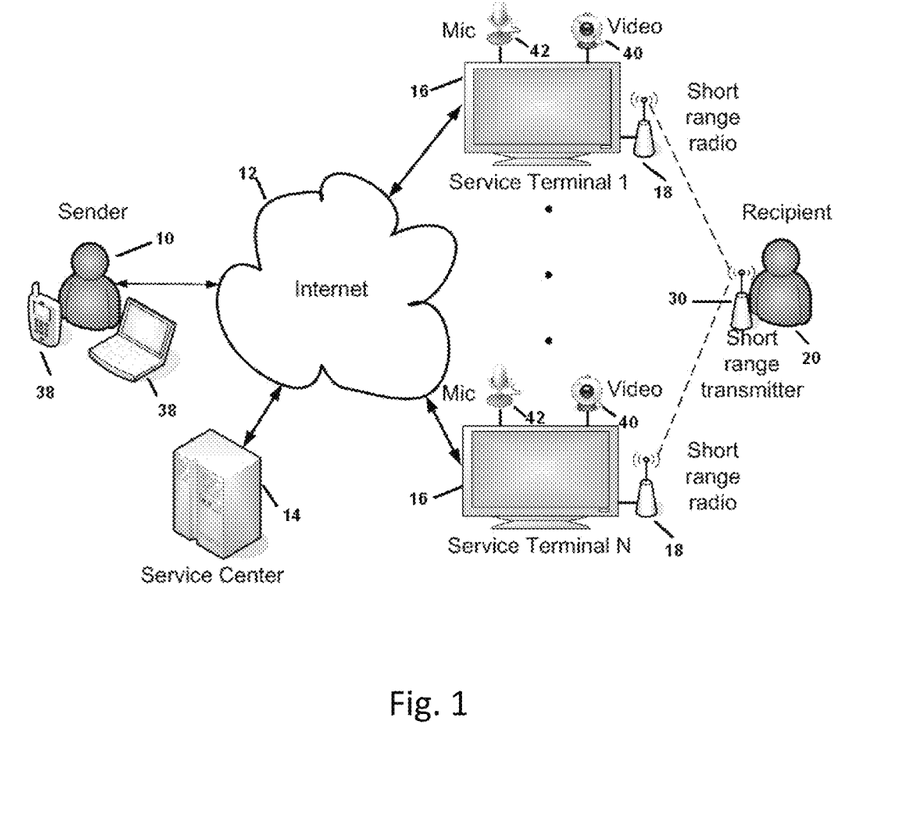
FIG. 1 shows a simplified block diagram illustrating an exemplary system architecture according to a first exemplary embodiment.

FIG. 1 illustrates a perspective view of a communication system according to a first exemplary embodiment. FIG. 1 illustrates a perspective view of an exemplary personalized greeting and advertisement system in which a sender 10 is an individual user, connected, by means of a user terminal 38, to the Internet 12 by the time of placing a personalized greeting or advertisement into the system. The connection to the Internet 12 may be provided by a wired or wireless link from any place where Internet service is available.

A service center 14 is a core network element of the personalized greeting and advertisement system, for facilitating a user interface, handling data flow, and/or providing system management. The service center 14 may facilitate different ways of how to access the personalized greeting and advertisement system from the sender's 10 personalized desktop computer 38, laptop computer 38, handheld computer 38, cellular phone 38, etc. Any suitable technology that makes it possible to place personalized greeting or advertisement media into the service center 14 database may be utilized. For example, a web portal of the service center 14 may be used to place personalized greeting or advertisement media into the service center 14 database. The sender 10 is a registered user of the personalized greeting and advertisement system. During system access authentication, the sender 10 may assign a recipient(s) 20 identification number (ID), select a service terminal 16, or a group of service terminals (any one or more of service terminal 1, service terminal 2, . . . , service terminal N) for the greeting or advertisement to be displayed, choose the content activation option, and upload greeting or advertisement content to the service center 14 database to be processed.

Different content activation options are disclosed herein to allow greeting or advertisement content to be viewed on the selected service terminal(s) 16. The term "content activation" as used herein may refer to the process when personalized greeting or advertisement content, stored in a computer memory of the service terminal 16 in the form of a text message, picture, video/audio clip, or any combination of such media, is brought up to the service terminal's 16 monitor for the recipient(s) 20 observation. The term "content activation" as used herein may also refer to the interactive two-steps content delivery when the service terminal apparatus displays the uploaded content on a monitor of the service terminal apparatus on the first step, and after service terminal recognizes change in movement (e.g., slow down, specific body gestures, and such) or facial pattern, or gets voice confirmation that message content is acquired by recipient, the second step of message content delivery is employed to display the remaining parts of message content being uploaded to the service terminal as a said interactive two-steps message content delivery. The video camera 40 and microphone 42 of service terminal 16 are employed specifically to support the interactive two-steps content delivery option. One of ordinary skill in the art would appreciate that modern, so-called "Smart TV"s, are equipped with hardware that will allow the system to perform certain functional aspects of the methods described herein (e.g., processor, memory, internet connection, video camera, microphone). In certain embodiments, the system may be configured to utilize the hardware integrated into such Smart TVs to act as a service terminal, generally by way of an installed application or otherwise providing modules or software to direct the hardware of a Smart TV to act in accordance with the methods and systems described herein.

In certain embodiments, the system, and particularly service terminals, may utilize two or more reaction detection means (e.g., microphones, cameras, RFIDs, range finders) to detect the recipient's reaction to the first displayed content. The more reaction detection means that detect appropriate reactions from the recipient (e.g., slow down, change in facial elements, voice acknowledgement), the higher probability false positives will be eliminated. For instance, if the recipient changes his or her pace for other reasons or glances quickly at the service terminal without comprehending the first displayed content, a single reaction detection means could accidentally send a false positive.

In certain embodiments, the system may have various thresholds set for reaction detection. For instance, regarding change in pace/movement, the system may require a significant altering of pace and that pace alteration sustained for a period of time (e.g., 1 second, 2 seconds, 5 seconds) or change of pace plus alteration of movement direction (e.g., increasing angle/approach towards the service terminal). Failure to cross the threshold will result in the system not to acknowledge delivery of the first display content. Crossing the threshold, whether with one or multiple reaction detection means, may cause the system to confirm receipt of the first display content and proceed with the interaction with the recipient.

In certain embodiments, the system may be configured to provide the first display content to user via a publicly viewable service terminal but inform the user that the second display content will only be viewable on a private or semi-private service terminal. For instance, if the content of the second display content is personal, profane or otherwise should not be viewed in a public setting, the system may be configured to provide the first display content to the recipient and identify where the recipient can go or what the recipient can do to receive the second display content.

According to an embodiment of the present invention, the second display content may be comprised of one or more of a pre-recorded interaction, a request for a live interaction (e.g., with sender or other individual such as through a video conferencing means), a live interaction (e.g., with sender or other individual such as through a video conferencing means), or any combination thereof.

In certain embodiments, the system may be configured to wait to communicate the second display content until receiving a particular reaction from recipient. This particular reaction may be separate from the reaction detection previously described and may be used in conjunction with or in lieu of said reaction detection. In certain embodiments, recipient may be required to activate display of the second display content by gesture, facial reaction, or speech recognition involving the techniques. For example, when one arrived to airport and passing by service terminals containing greeting for him, that greeting message will pop up on the screen. Because message is personally addressed, the natural human reaction on it is to stop, read message or view picture or video clip content, then smile, make gestures, say exclamation phrases, etc. Such activities in front of service terminal camera and microphone may initiate a sequence of previously uploaded meaningful messages associated with the main greeting. Let's say, on message "Hello John, welcome to San Francisco!" the recipient will stop, smile and wave to screen, which will activate the next message "We knew you will like this greeting. Glad to see your smiling face. We will meet you in hotel in 1 hour".

Figure 2:
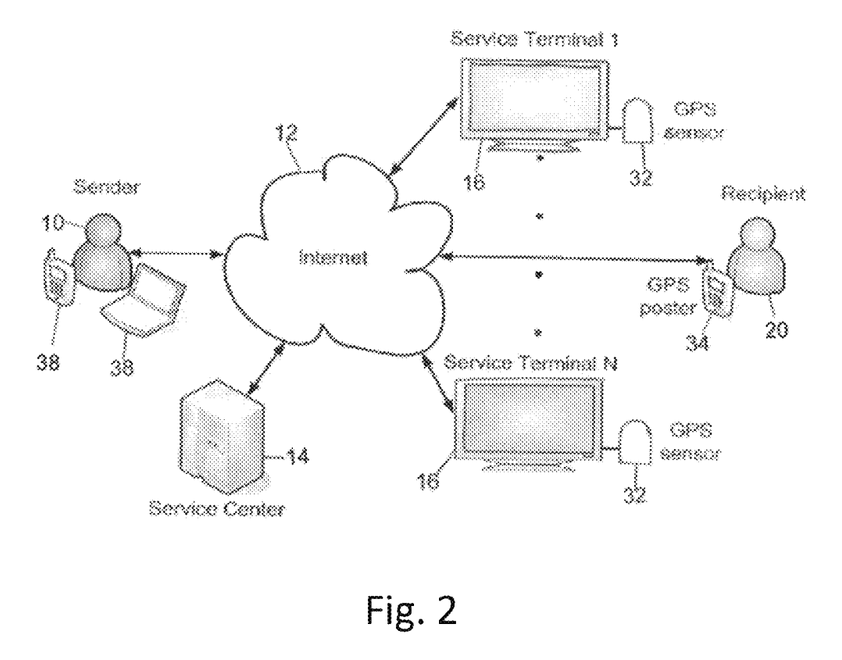
FIG. 2 shows a simplified block diagram illustrating an exemplary system architecture according to a second exemplary embodiment.

FIG. 2 is a perspective view of a communication system for GPS-based identification of the recipient's 20 presence in accordance with a second exemplary embodiment.

The first and second exemplary embodiments are based on determining whether the recipient 20 for whom a personalized greeting or advertisement is stored in the service terminal 16 memory is in a close proximity of that service terminal 16. The term close proximity is used herein to refer, for example, to a range of about a hundred feet where an average person is able to visually recognize the greeting or advertisement message or video clip on a big screen monitor 24. This range may be longer or shorter, depending on numerous factors, such as the size of the big screen monitor and the level of detail of content to be displayed (e.g., text requires closer proximity than images) The term big screen monitor 24 is used herein to refer, for instance, a modern LCD, LED, or plasma technology monitor. Preferred embodiments may be used with monitors of a size of about 50 inches (diagonal screen measurement). A first exemplary embodiment is based on use of a short range radio 18 link.

The term short range radio 18 is used herein to refer to a wireless communication device with the range of up to about one or several hundred feet. Such short range radio signals may correspond, for instance, to a garage opener, remote car lock, or such. The first exemplary embodiment may require the recipient 20 to carry on a short range transmitter 30 that is powered up and running in a beacon mode. The short range transmitter 30 allows the unique ID of the recipient 20 to be periodically broadcasted. For example, a modern hand held device such as a cellular phone may be used as an ID beacon utilizing WiFi, Bluetooth or similar technologies. The period of broadcasting may vary; it may involve, for example, about a 5-10 seconds time interval.

In the second exemplary embodiment, the global positioning system (GPS) data is utilized for identification of a relative position of the service terminal 16 and recipient 20. The GPS position of each service terminal 16 is measured with a GPS sensor 32 and stored in a service center 14 database. The second exemplary embodiment may require the recipient 20 to carry on a GPS poster 34 (a GPS position transmitter). The GPS poster 34 periodically transmits, to the service center 14, information on the recipient's current position along with the recipient's ID. The period for the recipient's position update may be the same as described above in connection with the first exemplary embodiment, i.e. a time interval of about 5-10 seconds may be used. The service center 14 may require that a monitoring and decision making program runs uninterruptedly in the service center 14. This program is employed to identify whether any of the registered recipients are in a close proximity of any service terminal 16, and whether the service terminal 16 has greeting or advertisement content stored in its memory for that particular recipient 20. If at least one of the registered recipients is in a close proximity of a service terminal 16, and if the service terminal 16 has greeting or advertisement content stored in its memory for that particular recipient 20, the service terminal 16 brings the stored greeting or advertisement content information up on the screen. The expression close proximity may refer to the same as in the exemplary embodiment described above. For example, a modern GPS-enabled cellular telephone 32 may be employed as a GPS poster 34 to upload the recipient's position data to the service center 14 over any available cellular or wireless network.

Figure 3:
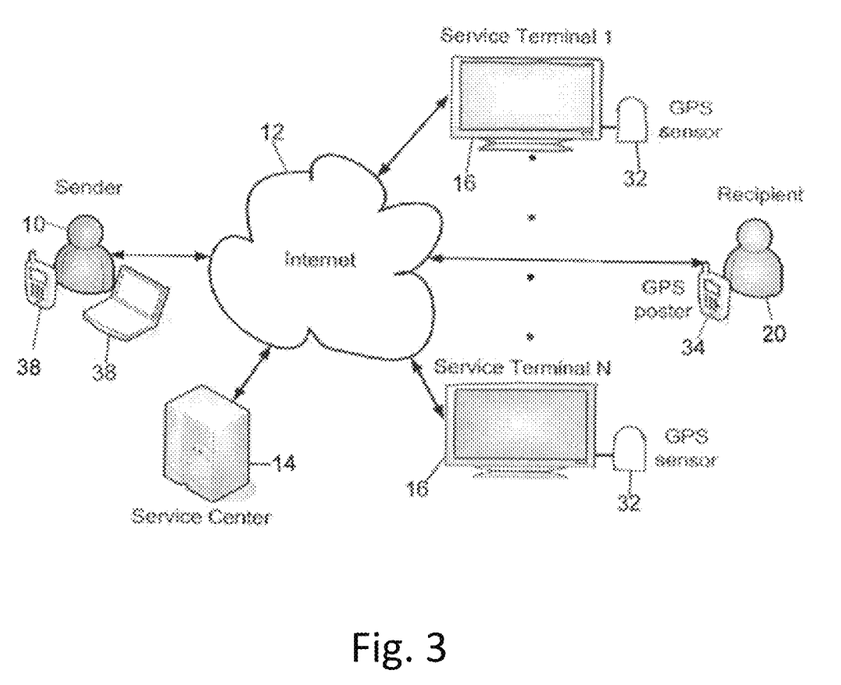
FIG. 3 shows a simplified block diagram illustrating an exemplary system architecture according to a third exemplary embodiment.

FIG. 3 is a perspective view of a communication system for implementing content activation based on a time schedule, or for anonymous recipients, in accordance with a third exemplary embodiment. FIG. 3 illustrates personalized greeting and advertisement system utilization for content activation based on a time schedule 36 for recipients who most likely are located in the close proximity of the service terminal 16 at a particular time, or for anonymous recipients. It represents a content activation option that employs time frame scheduling. It allows the sender 10 to set up an exact time when the greeting or advertisement content stored in the selected service terminal(s) 16, is to be activated and brought up on the screen. It also enables defining a time duration and a number of repetitions for that content. This content activation option is suitable for recipients who are not equipped with any position identification devices described above in connection with the first and second exemplary embodiments, as well as for the general public advertising. It may be used e.g. by service terminals located at populated places like airports, college campus, along the road, and such, where the time of the recipient's appearance is usually well known or easy to be predicted.

Content activation options described above may be employed simultaneously in any combinations, or alone.

Figure 4:
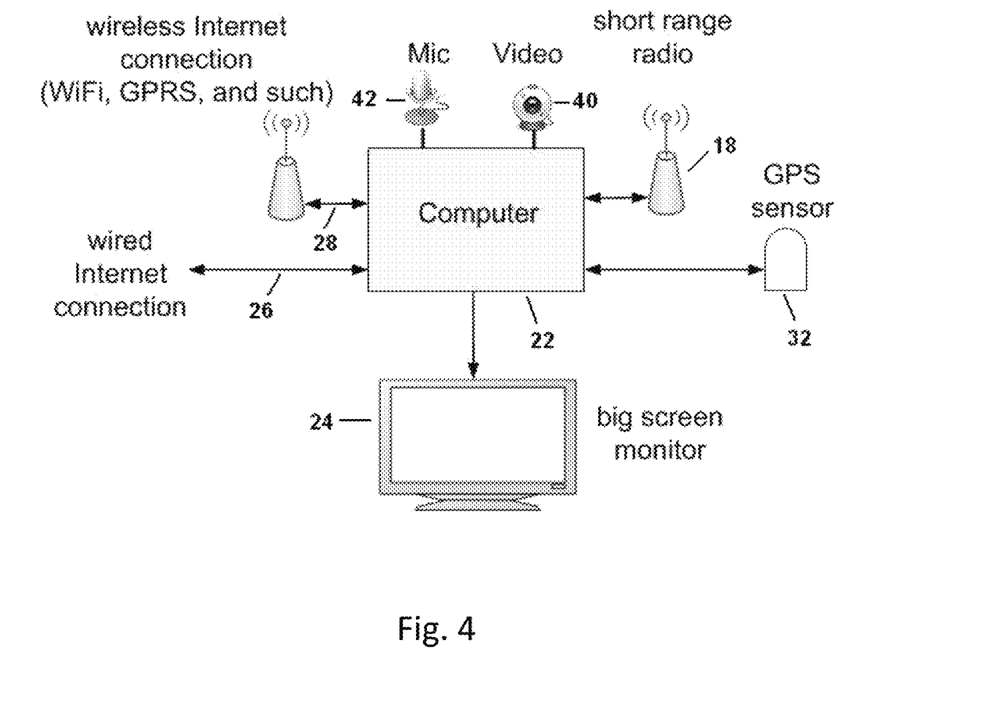
FIG. 4 shows a simplified block diagram illustrating exemplary apparatuses.

FIG. 4 illustrates a service terminal infrastructure of a greeting and advertisement system in accordance with an exemplary embodiment. Referring to FIG. 4, a computer 22 of the service terminal 16 may be employed to provide one or more of the following:

- a wireless Internet connection 28,
- a wired Internet connection 26,
- a short range radio 18 link,
- a video camera 40,
- a microphone 42,
- GPS acquiring,
- displaying the personalized greeting and advertisement content on a big screen monitor 24,
- a personalized greeting and advertisement content storage update and protection,
- a periodic service terminal 16 status report back to the service center 14.

According to an exemplary embodiment, the service terminal 16 comprises a device with a global reach capability, providing a connection via the Internet 12. The way the service terminal 16 is connected to the Internet 12 may depend on the availability of different types of Internet 12 connections. A multi-pass approach may be employed for the Internet 12 connection flexibility and robustness to keep the service terminal 16 operational in case one or more of the connections are unavailable or malfunctioning. Examples of wireless Internet connections 28 include a WiFi hot spot, and/or a general packet radio service (GPRS) provided by a local cellular phone network, or any other wireless or cellular connection. The service terminal 16 computer 22 may also be equipped with a short range radio 18 that is capable of continuously listening to the recipient's 20 short range transmitter 30 beacon signals to identify whether any recipients are in the close proximity of the service terminal 16. The short range radio 18 may be capable to operate on several frequencies. The GPS sensor 32 is employed to provide location information on the service terminal 16. The GPS sensor 32 may be an optional feature. The big screen monitor 24 may be a part of the service terminal 16 that appears to the user. The size of the monitor may vary depending on the area of service. It may be relatively small when used in public transportation, for example, in a taxi car, bus, airplane, etc. It may also be as big as several meters in size when used in a wide open public area like a sport arena, convention center, big street, etc. A common use of the greeting and advertisement system in accordance with an exemplary embodiment anticipates as a suitable size of a monitor about 50 inches, for example. For outdoor use, the service terminal 16 may have some kind of a weather protection cover in it or attached to it.

If in some area a big screen monitor is already installed and in use, it may be utilized by adding a personalized greeting and advertisement system functionality to it. In such cases, only the computer 22 together with its peripheral devices and interfaces assembled in one enclosure may need to be added.

FIGS. 1 to 4 show one or more sender devices 38 located in the service area of the service centre node 14. The sender device may refer to a portable computing device, and it may also be referred to as a user terminal (user equipment). Such computing devices include wireless, wired and/or mobile communication devices operating with or without a subscriber identification module (SIM) in hardware or in software, including, but not limited to, the following types of devices: mobile phone, smartphone, personal digital assistant (PDA), handset, laptop computer, desktop computer. In the example situation of FIGS. 1 to 4, the sender device 38 is capable of connecting to the service centre node 14 via the Internet 12.

FIGS. 1 to 4 only illustrates a simplified example. In practice, the network may include more base stations and radio network controllers, and more cells may be formed by the base stations. The networks of two or more operators may overlap; the sizes and form of the cells may vary from what is depicted in FIGS. 1 to 4, etc. The communication system may also be able to communicate with other networks, such as a public switched telephone network. The embodiments are not, however, restricted to the network given above as an example, but a person skilled in the art may apply the solution to other communication networks provided with the necessary properties. For example, the connections between different network elements may be realized with Internet protocol (IP) connections.

FIGS. 1 to 4 only illustrate a simplified example. In practice, the network may include fewer or additional network elements. The networks of two or more operators may overlap; the sizes and form of the networks may vary from what is depicted in FIGS. 1 to 4, etc. The communication system may also be able to communicate with other networks, such as a public switched telephone network. The embodiments are not, however, restricted to the network given above as an example, but a person skilled in the art may apply the solution to other communication networks provided with the necessary properties.

Figure 5:
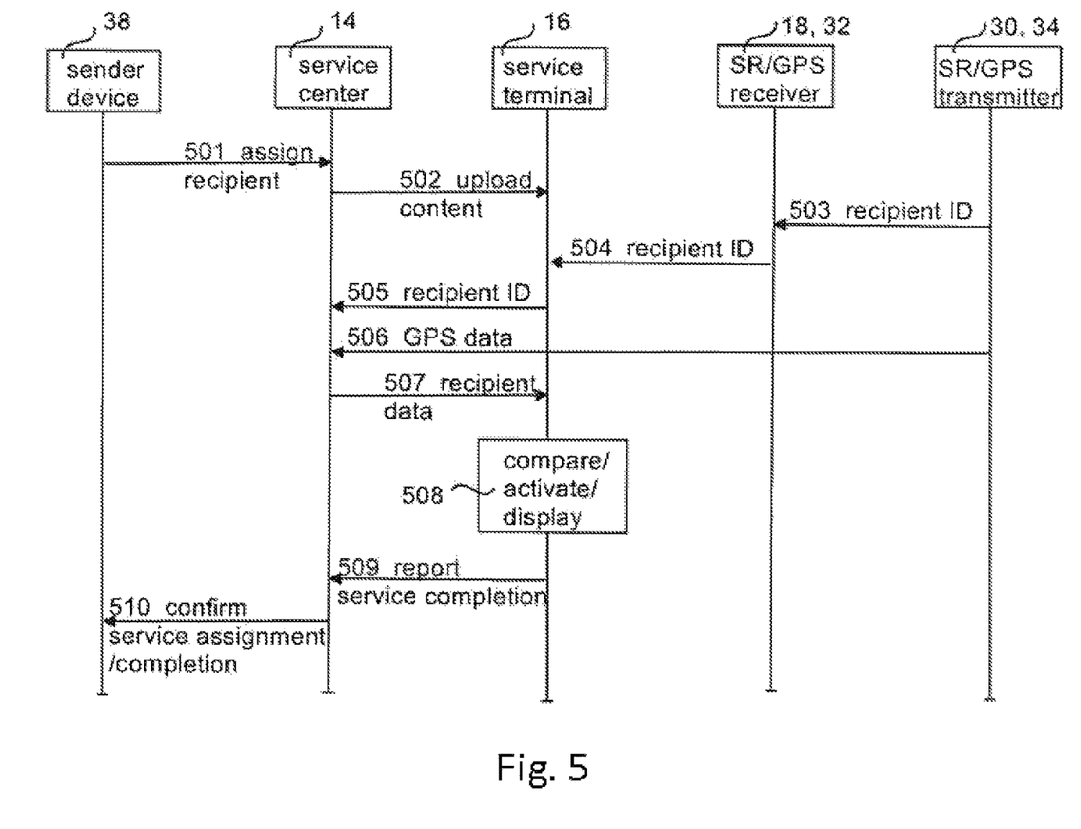
FIG. 5 shows a messaging diagram illustrating an exemplary messaging event according to the first and second exemplary embodiments.

The signalling chart of FIG. 5 illustrates a preferred signalling according to the first and second exemplary embodiments. In the example of FIG. 5, a sender device 38 which may comprise e.g. a user equipment, transmits, in a message 501, to a service center apparatus 14, information on a recipient identification and information on one or more service terminal apparatuses assigned, in the sender device 38, for a content service. The service center apparatus 14 that may include e.g. a service center node or server, may also receive the respective content in message 501 (and respond to the sender device 38 with a service assignment confirmation message 510). The content service herein may refer to a personalized greeting and/or advertisement as disclosed above. The received information and/or content may be stored in a database memory by the apparatus 14. In message 502, the service sender apparatus 14 transmits signalling to the one or more assigned service terminal apparatuses 16, for uploading the content service to the one or more assigned service terminal apparatuses.

In a message 503, according to the first exemplary embodiment, information on a recipient identification is transmitted from a transmitter device 30 of the recipient to a receiver device 18 of a service terminal apparatus 16. The transmitter device 30 of the recipient may include e.g. a short range radio transmitter 30 capable of transmitting recipient identification messages. The receiver device 18 of the service terminal apparatus 16 may include e.g. a short range radio receiver 18 capable of listening to recipient identification messages. In a message 504, the information on the recipient identification is forwarded from the receiver device 18 of the service terminal apparatus 16 to the corresponding service terminal apparatus 16. In a message 505, the information on the recipient identification may be forwarded from the service terminal apparatus 16 to the service center apparatus 14. The service center apparatus 14 may also receive service terminal apparatus's 16 location data transmitted by the receiver device 18 of the assigned service terminal apparatuses 16 (not shown in FIG. 5). In step 508, the service terminal apparatus 16 compares its own location information with the location of the receiver device 18 which received the recipient identification from the transmitter device 30 of the recipient. If, based on the comparing, it is detected 508 that the service terminal apparatus 16 is the one the receiver device 18 of which received the recipient identification from the transmitter device 30 of the recipient, the service terminal apparatus 16 brings 508 the uploaded content service up on the monitor of the selected service terminal apparatus 16.

In a message 506, according to the second exemplary embodiment, the service center apparatus 14 receives recipient GPS location data from a transmitter device 34 of the recipient. The transmitter device 34 of the recipient may comprise e.g. a GPS poster 34 capable of transmitting information on a location of the transmitter device 34 of the recipient. The service center apparatus 14 may also receive service terminal apparatus's GPS location data from a GPS sensor 32 of the service terminal apparatus 16 (not shown in FIG. 5). In a message 507, the apparatus 14 transmits the recipient GPS location data to the same service terminal apparatus 16 where content for the recipient ID provided in message 505 has been uploaded in message 502. In step 508, the service terminal apparatus 16 compares the recipient's GPS location information received in message 507, with the service terminal apparatus's own location information to identify if the recipient 20 is in close proximity. If based on the comparing, the service terminal apparatus 16 identifies that the recipient is in the close proximity of the service terminal apparatus 16, the service terminal apparatus 16 activates, in step 508, the stored content to display the content on the service terminal screen in step 508. In a message 509, the service terminal apparatus 16 may transmit a service completion confirmation to the service center apparatus 14, wherein, in a message 510, the service center apparatus 14 may in turn transmit a service completion notification to the sender device 38. Priority logic and a queue technique may be employed by the computer 22 if more than one recipient 20 are simultaneously requesting a service in the close proximity of the service terminal apparatus 16.

Figure 6:
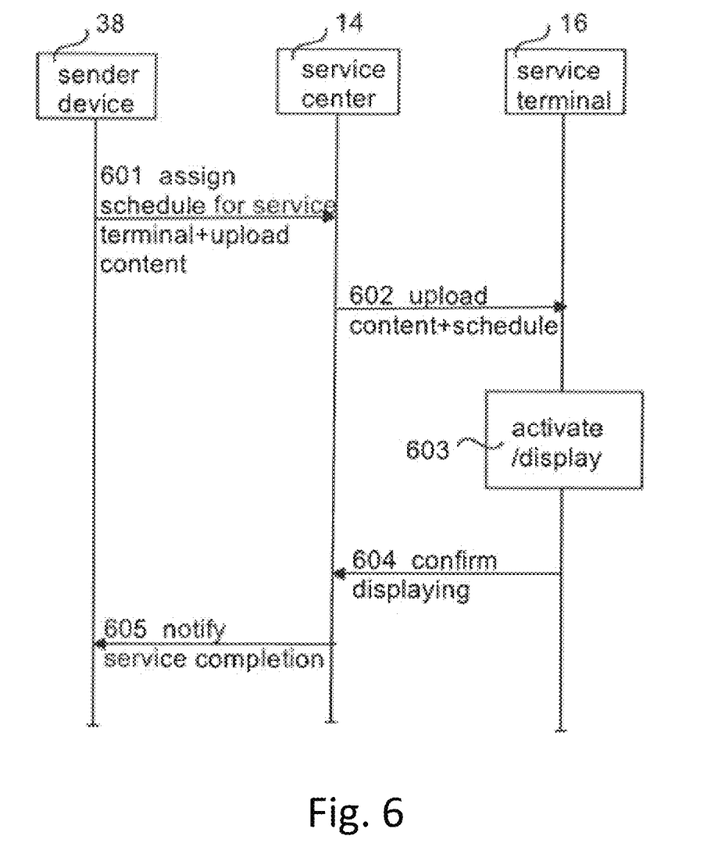
FIG. 6 shows a messaging diagram illustrating an exemplary messaging event according to the third exemplary embodiment.

The signalling chart of FIG. 6 illustrates a preferred signalling according to the third exemplary embodiment. In the example of FIG. 6, a sender device 38 which may comprise e.g. a user equipment, transmits, in a message 601, to a service center apparatus 14, information on a time schedule and one or more service terminal apparatuses assigned, in a sender device, for a content service. The service center apparatus 14 that may include e.g. a service center node or server, may also receive the respective content in message 601. The content service herein may refer to a personalized greeting and/or advertisement as disclosed above. The received information and/or content are transmitted, in message 602, from the service center apparatus 14 to the one or more assigned service terminal apparatuses 16, wherein in a message 602, the service center apparatus 14 transmits signalling to the one or more assigned service terminal apparatuses 16, for uploading the content service to the one or more assigned service terminal apparatuses 16. The received information and/or content may be uploaded and stored in the service terminal memory. In step 603, the service terminal apparatus 16, based on the received time schedule, activates the content service, for inviting the selected service terminal apparatus 16 to display the uploaded content service on a monitor of the selected service terminal apparatus 16. In step 603, the selected service terminal apparatus 16 displays the uploaded content service on the monitor of the selected service terminal apparatus 16. In a message 604, the service terminal apparatus 16 may report the service completion to the service center apparatus 14, wherein the service center apparatus 14 may subsequently notify, in a message 605, the sender device 38 on the service completion.

Figure 7:
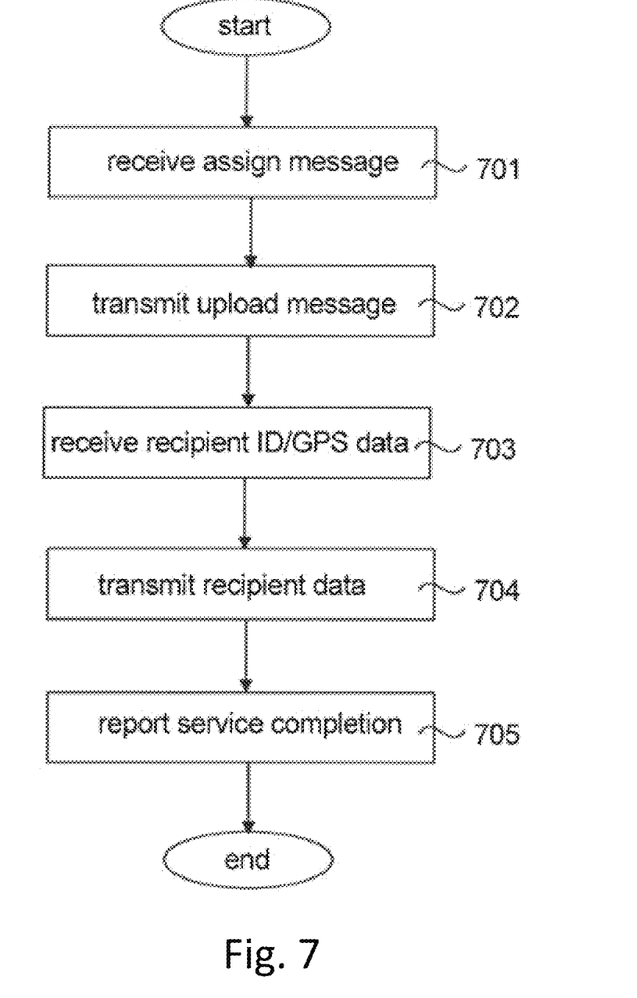
FIGS. 7, 8 and 9 show a schematic diagram of a flow chart according to an exemplary embodiment.

FIG. 7 is a flow chart illustrating the first and second exemplary embodiments. In step 701, a service center apparatus 14 receives, from a sender device 38, information on a recipient identification and information on one or more service terminal apparatuses assigned, in the sender device 38, for a content service. The service center apparatus 14 that may include e.g. a service center node or server, may also receive the respective content in step 701. The content service herein may refer to a personalized greeting and/or advertisement as disclosed above. The received information and/or content may be stored 701 in a database memory by the service center apparatus 14. In step 702, the service center apparatus 14 transmits signalling to the one or more assigned service terminal apparatuses 16, for uploading the content service to the one or more assigned service terminal apparatuses.

In step 703, according to the first exemplary embodiment, information on a recipient identification is received from a service terminal 16. In step 704, the service center apparatus 14 may transmit the received recipient information to the service terminal apparatus 16, the receiver device 18 of which received the recipient identification from the transmitter device 30 of the recipient In step 703, according to the second exemplary embodiment, recipient GPS location data is received from a transmitter device 34 of the recipient. In step 704, the service center apparatus 14 transmits the GPS location information received in step 703 to the assigned service terminal apparatuses assigned for recipient ID and containing the uploaded service message 702 for that recipient ID.

In step 705, the service center apparatus 14 may receive, from the service terminal apparatus 16, a service completion message, wherein the service center apparatus 14 may subsequently notify the sender device 38 by forwarding, in step 705, the service completion message to the sender device 38.

According to the third exemplary embodiment, in step 701, a service center apparatus 14 receives, from a sender device 38, information on a time schedule and one or more service terminal apparatuses assigned for a content service. The service center apparatus 14 that may include e.g. a service center node or server, may also receive the respective content in step 701. The content service herein may refer to a personalized greeting and/or advertisement as disclosed above. The received information and/or content may be stored in a database memory by the service center apparatus 14. In step 702, the service center apparatus 14 transmits signalling to the one or more assigned service terminal apparatuses 16, for uploading the content service and the received time schedule to the one or more assigned service terminal apparatuses 16. In step 705, the service center apparatus 14 may receive, from the service terminal apparatus 16, a service completion message, wherein the service center apparatus 14 may subsequently notify the sender device 38 by forwarding, in step 705, the service completion message to the sender device 38.

Figure 8:
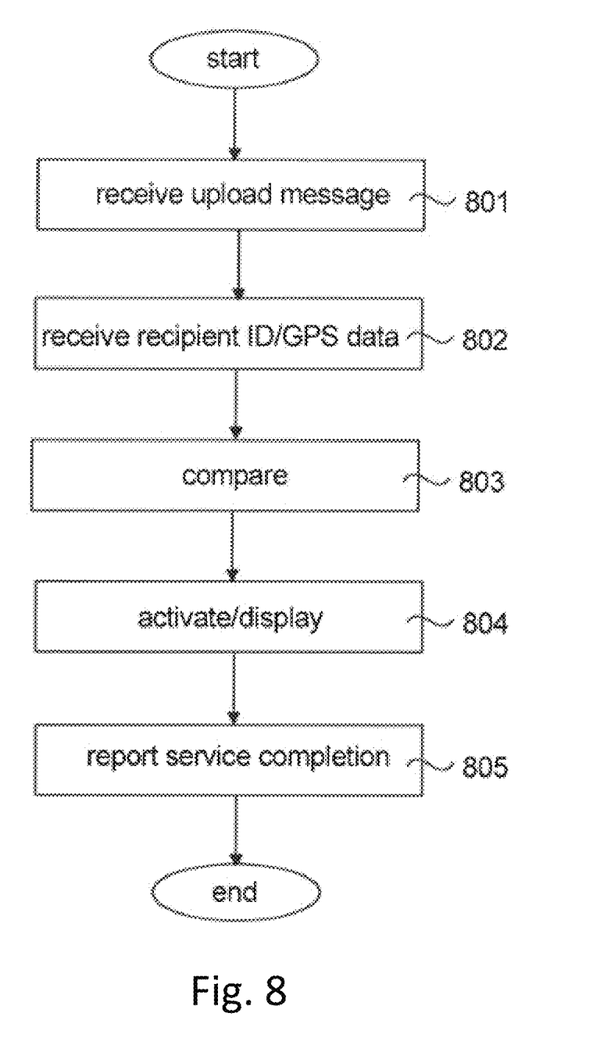

FIG. 8 is a flow chart illustrating an exemplary embodiment. According to the first and second exemplary embodiments, in step 801, a service terminal apparatus 16 receives, from a service center apparatus 14, signalling inviting the service terminal apparatus 16 to upload a content service to the service terminal apparatus 16. In step 802, the service terminal apparatus receives information on a recipient identification or recipient GPS location data from a receiver device 18, 32 of the service terminal apparatus 16.

According to the first exemplary embodiment, in step 803, the service terminal apparatus 16 compares its location information with the location of the receiver device 18 which received the recipient identification from the transmitter device 30 of the recipient. If, based on the comparing, it is detected 803 that the service terminal apparatus 16 is the one the receiver device 18 of which received the recipient identification from the transmitter device 30 of the recipient, the service terminal apparatus 16 brings the uploaded content service up on the monitor of the selected service terminal apparatus 16.

According to the second exemplary embodiment, in step 803, the service terminal apparatus 16 compares the recipient's GPS location information with the service terminal apparatus's own location information to identify if the recipient 20 is in close proximity. If it is, in step 804, the service terminal apparatus activates the content service, inviting the service terminal apparatus 16 to display the uploaded content service on a monitor of the service terminal apparatus, wherein, in step 804, the service terminal apparatus 16 displays the uploaded content service on the monitor of the service terminal apparatus.

In step 805, the service terminal apparatus 16 may transmit a service completion message to the service center apparatus 14.

According to the third exemplary embodiment, in step 801, a service terminal apparatus 16 receives; from a service center apparatus 14, signalling inviting the service terminal apparatus 16 to upload a content service and a service schedule to the service terminal apparatus 16. In step 804, the service terminal apparatus activates the uploaded content service according to the received schedule, inviting the service terminal apparatus 16 to display the uploaded content service on a monitor of the service terminal apparatus, wherein, in step 804, the service terminal apparatus 16 displays the uploaded content service on the monitor of the service terminal apparatus. In step 805, the service terminal apparatus 16 may transmit a service completion message to the service center apparatus 14.

Figure 9:
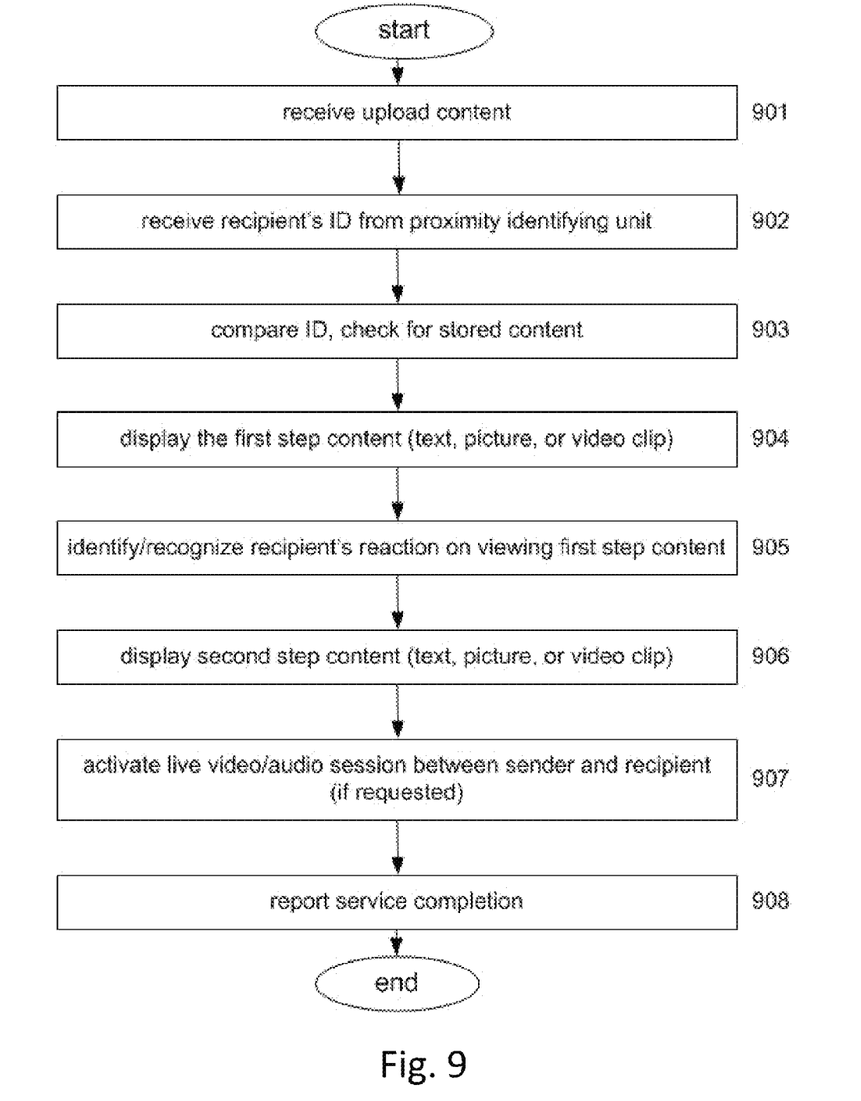

FIG. 9 is a flow chart illustrating an exemplary embodiment. According to the first and second exemplary embodiments, in step 901, a service terminal apparatus 16 receives from a service center apparatus 14, signalling inviting the service terminal apparatus 16 to download a content to the service terminal apparatus 16. In step 902, the service terminal apparatus receives information from recipient proximity identifying unit 18, 32 of the service terminal apparatus 16.

In step 903, the service terminal apparatus 16 identifies if any information for interactive two-steps content delivery is stored in terminal memory for ID of recipient 20, and if content found, displays its first step content on the monitor of service terminal apparatus 16 in step 904.

In step 905, the service terminal apparatus 16 identifies if any information for the second step of interactive two-steps content delivery is stored in terminal memory for ID of recipient 20, and if content found, starts procedure to recognize recipient's reaction utilizing video camera 40 and microphone 42 of service terminal 16, and when some form of reaction like changes in motion pattern, facial pattern, voice reaction pattern and such is confirmed, the second step content stored in service terminal 16 for two-steps content delivery is bringing up on the monitor of service terminal apparatus 16 to be displayed in step 906. In certain embodiments, service terminals may utilize two or more reaction detection means simultaneously in order to improve accuracy of reaction detection.

In step 907, if live interaction session is requested for the second step of two-steps content delivery, then instead of static content the live video/audio session is employed in service terminal 16 in form of Skype or similar known in live video chatting technique, to provide with support of video camera 40 and microphone 42 a short video/audio session between sender 10 and recipient 20. The two-steps content delivery is concluding in step 908 by sending two-steps content delivery confirmation to the service center 14.

The techniques described herein may be implemented by various means so that an apparatus implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firm-ware or software, implementation can be through modules (e.g., procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

User equipment may refer to any user communication device. Term "user equipment" as used herein may refer to any device having a communication capability, such as a wireless mobile terminal, a PDA, tablet, a smart phone, a personal computer (PC), a laptop computer, a desktop computer, etc. For example, the wireless communication terminal may be an UMTS or GSM/EDGE smart mobile terminal having wireless modem. Thus, the application capabilities of the device according to various embodiments of the invention may include native applications available in the terminal, or subsequently installed applications by the user or operator or other entity. The operations, administrations and maintenance node may be implemented in any network element, such as a server.

Thus a personalized greeting and advertisement arrangement for allowing individual is disclosed to create and display a personal greeting or advertisement content over the global reach media. The arrangement may involve a sender 10 for providing personalized greeting and advertisement content by using a sender apparatus 38, a recipient viewing personalized greeting and/or advertisement content, an Internet 12 for providing global reach capability, actively connected to the sender apparatus 38, a service center apparatus 14 for data management of electronic content and business logic support, permanently connected to the Internet 12, a service terminal apparatus 16 for displaying personalized greeting and/or advertisement content, a short range radio apparatus 18 for listening to customer identification messages, a short range transmitter apparatus 30 for transmitting customer identification messages, wirelessly connected to the short range radio apparatus 18, and suitably equipped to be carried with by the recipient 30, a GPS sensor for transmitting the service terminal's 16 position location identification, a GPS poster apparatus 34, for transmitting the recipient's 20 position location identification, wirelessly connected to the Internet 12, and suitably equipped to be carried with by the recipient 20, a computer unit 22 of the service terminal apparatus 16 for communication with the service center apparatus 14, for managing greeting and advertisement content flow, for bringing content on the big screen monitor 24 to be viewed, and operationally connected to the GPS sensor apparatus 32 and/or the short range radio apparatus 18, a big screen monitor 24 for making the greeting/advertisement content viewable, operationally connected to the computer unit 22, and viewable by the recipient 20, a wired Internet connection 26 for connection to the service center 14, operationally connected to the computer unit 22, and operationally connected to the Internet 12, a wireless Internet connection 28, for wireless connection to the service center apparatus 14, operationally connected to the computer unit 22, and operationally connected to the Internet 12, and a time schedule data 36 for greeting and advertisement invocation from internal memory of the computer unit 22 within assigned time frame, remotely assigned to the computer unit 22, an external or embedded video camera 40, operationally connected to computer unit 22, an external or embedded microphone 42, operationally connected to computer unit 22.

Thus, in an exemplary embodiment, the service center 14 may be configured to provide an overall system functionality via a global reach media, to create and support user accounts, maintain a web portal for the user accounts, statistics, services, etc., to perform GPS data tracking, to handle financial data flow, and/or to provide system statistics and troubleshooting for future development and improvement.

In an exemplary embodiment, the service terminal 16 may be configured to receive service content from the service center mainly accompanied by a recipient ID and/or a time schedule, to identify registered recipients in a close proximity based on recipients' IDs transmitted via a short range radio link, to display service content in the form of a personalized greeting and/or advertisement based on a method selected from 1) listening to and comparing recipient ID with a list of assigned service terminals 16 for the service IDs in a particular service terminal 16, 2) listening to service center messages notifying that based on the recipient's GPS data s/he is in a close proximity of a particular service terminal 16, 3) bringing up to the screen messages stored in the service terminal 16 based on a time schedule of the message assigned by the service center 14, and executing an interactive two-steps content delivery to the service terminal if such is requested.

The steps/points, signalling messages and related functions described above in FIGS. 1 to 9 are in no absolute chronological order, and some of the steps/points may be performed simultaneously or in an order differing from the given one. Other functions can also be executed between the steps/points or within the steps/points and other signalling messages sent between the illustrated messages. Some of the steps/points or part of the steps/points can also be left out or replaced by a corresponding step/point or part of the step/point. The apparatus operations illustrate a procedure that may be implemented in one or more physical or logical entities. The signalling messages are only exemplary and may even comprise several separate messages for transmitting the same information. In addition, the messages may also contain other information.

According to an exemplary embodiment, there is provided a method comprising receiving information on a recipient identification in a service terminal apparatus assigned, in a sender device, for the content service; uploading the content service to the assigned service terminal apparatus; receiving, in the service terminal apparatus, information on the recipient identification received from a transmitter device of the recipient by a receiver device of the service terminal apparatus; comparing location information on the service terminal apparatus with location information of the receiver device which received the recipient identification from the transmitter device of the recipient; wherein if, based on the comparing, it is detected that the service terminal apparatus is the service terminal apparatus the receiver device of which received the recipient identification from the transmitter device of the recipient, the method comprises activating the content service in the service terminal apparatus for inviting the service terminal apparatus to display the uploaded content service on a monitor of the service terminal apparatus as a single step content delivery or interactive two-steps content delivery to the service terminal if such is requested.

According to another exemplary embodiment, there is provided a method comprising receiving information on a recipient identification in a service terminal apparatus assigned, in a sender device, for the content service; uploading the content service to the assigned service terminal apparatus; receiving, in the service terminal apparatus, information on a location of a transmitter device of the recipient; comparing the received location information with location information on the assigned service terminal apparatus; wherein, if, based on the comparing, the service terminal apparatus identifies that the recipient is in a close proximity of the service terminal apparatus, the method comprises activating the content service in the service terminal apparatus for inviting the service terminal apparatus to display the uploaded content service on a monitor of the service terminal apparatus.

According to a yet another exemplary embodiment, there is provided a method comprising receiving information on a time schedule in a service terminal apparatus assigned, in a sender device, for the content service; uploading the content service to the assigned service terminal apparatus; based on the received time schedule, activating the content service in the service terminal apparatus for inviting the service terminal apparatus to display the uploaded content service on a monitor of the service terminal apparatus.

According to a yet another exemplary embodiment, there is provided a service center apparatus configured to receive information on a recipient identification and one or more service terminal apparatuses assigned, by a sender device, for a content service; upload the content service to the one or more assigned service terminal apparatuses; transmit the received information on the recipient identification to the one or more assigned service terminal apparatuses.

According to a yet another exemplary embodiment, there is provided a service center apparatus configured to receive information on a recipient identification and one or more service terminal apparatuses assigned, in a sender device, for a content service; upload the content service to the one or more assigned service terminal apparatuses; receive information on a location of a transmitter device of the recipient; transmit the information on the location of the transmitter device of the recipient to the same service terminal apparatus where the content service for the recipient identification was uploaded.

According to a yet another exemplary embodiment, there is provided a service center apparatus configured to receive information on a time schedule and one or more service terminal apparatuses assigned, in a sender device, for a content service; upload the content service to the one or more assigned service terminal apparatuses; transmit the received time schedule to the one or more assigned service terminals apparatuses.

According to a yet another exemplary embodiment, there is provided a service terminal apparatus configured to upload a content service based on an upload content service message received from a service center apparatus; receive information on a recipient identification received, from a transmitter device of a recipient, by a receiver device of the service terminal apparatus; compare location information on the service terminal apparatus with location information of the receiver device which received the recipient identification from the transmitter device of the recipient; wherein if, based on the comparing, it is detected that the service terminal apparatus is the service terminal apparatus the receiver device of which received the recipient identification from the transmitter device of the recipient, the service terminal apparatus is configured to activate the content service for inviting the service terminal apparatus to display the uploaded content service on a monitor of the service terminal apparatus.

According to a yet another exemplary embodiment, there is provided a service terminal apparatus configured to upload a content service based on an upload content service message received from a service center apparatus; receive information on a location of a transmitter device of a recipient; compare the received location information with location information of the service terminal apparatus; if, based on the comparing, the service terminal apparatus identifies that the recipient is in a close proximity of the service terminal apparatus, the service terminal apparatus is configured to activate the content service in the service terminal apparatus for inviting the service terminal apparatus to display the uploaded content service on a monitor of the service terminal apparatus.

According to a yet another exemplary embodiment, there is provided a service terminal apparatus configured to receive information on a time schedule for a content service; upload the content service based on an upload content service message received from a service center apparatus; activate, based on the received time schedule, the content service in the service terminal apparatus for inviting the service terminal apparatus to display the uploaded content service on a monitor of the service terminal apparatus.

According to a yet another exemplary embodiment, the service center apparatus is connected to the sender device via a communications network providing a global reach capability.

According to a yet another exemplary embodiment, the service center apparatus is connected to the service terminal apparatus via a communications network providing a global reach capability.

According to a yet another exemplary embodiment, the service center apparatus comprises a service center node capable of data management of electronic content and business logic support.

According to a yet another exemplary embodiment, the content service comprises one of a greeting service and an advertising service.

According to a yet another exemplary embodiment, the receiver device of the service terminal apparatus comprises a short range radio capable of listening to customer identification messages.

According to a yet another exemplary embodiment, the transmitter device of the recipient comprises a short range transmitter for transmitting user identification messages, wirelessly connected to a short range radio, and suitably equipped for the recipient.

According to a yet another exemplary embodiment, the receiver device of the service terminal apparatus comprises a GPS sensor for identifying a location of a GPS poster.

According to a yet another exemplary embodiment, the transmitter device of the recipient comprises a GPS poster for transmitting user location information messages, wirelessly connected to the Internet, and suitably equipped to the recipient.

According to a yet another exemplary embodiment, the method comprises allowing a user of the sender device to create and display personalized greeting or advertisement content over a global reach media.

According to a yet another exemplary embodiment, the service terminal apparatus is configured to transmit location data on the service terminal apparatus to the service center apparatus.

According to a yet another exemplary embodiment, the method comprises employing a priority logic and a queue technique if more than one recipients are simultaneously found in the close proximity of the service terminal apparatus.

It will be obvious to a person skilled in the art that, as the technology advances, the inventive concept may be implemented in various ways. The invention and its embodiments are not limited to the examples described above but may vary within the scope of the claims.

What is claimed:

1. A method of providing a personalized greeting and advertisement content to a recipient in a communications system, wherein the method comprises:
    assigning one or more service terminals to display said content;
    selecting a content activation option which defines how said content will be presented to the recipient;
    activating the content in the assigned service terminal apparatus when the recipient is within a predetermined proximity of the service terminal apparatus, whereby at least one of the personalized message and advertising content is presented to the recipient according to the selected content activation option,
    wherein said content activation is an interactive content delivery, wherein the service terminal apparatus presents a first part of the content, waits for input from the identified recipient in the form of a specified change in movement, including slowing down, a body gesture, facial pattern, and/or voice acknowledgment, wherein upon receiving said input the service terminal apparatus presents a second part of the content.

2. The method of claim 1, further comprising sending identifying information about an intended recipient of said content via a sender device, wherein the sender is a registered user of a personalized greeting and advertisement content system.

3. The method of claim 2, further comprising receiving said identifying information in an assigned service terminal apparatus and uploading said content to the assigned service terminal apparatus.

4. The method of claim 2, wherein a service center apparatus is connected to the sender device via a communications network providing a global reach capability.

5. The method of claim 1, further comprising:
receiving, in the service terminal apparatus, a recipient ID and location information from a transmitter device of the recipient;
determining recipient location based on the location information received at the assigned service terminal apparatus; and
checking for content associated with the recipient ID in a memory of the service terminal apparatus.

6. The method of claim 5, wherein the transmitter device of the recipient comprises a short range transmitter for transmitting user identification messages, wirelessly connected to a short range radio, and suitably equipped for the recipient.

7. The method of claim 5, wherein the transmitter device of the recipient comprises a GPS poster for transmitting user location information messages, wirelessly connected to the Internet, and suitably equipped to the recipient.

8. The method of claim 1, wherein a service center apparatus is connected to the service terminal apparatus via a communications network providing a global reach capability.

9. The method of claim 1, wherein the content service comprises at least one of a greeting service and an advertising service.

10. The method of claim 1, wherein the service terminal apparatus comprises a receiver device having a short range radio capable of listening to customer identification messages.

11. The method of claim 10, wherein the receiver device of the service terminal apparatus comprises a GPS sensor for identifying a location of a GPS poster.

12. The method of claim 1, further comprising allowing a user of the sender device to create and display personalized greeting or advertisement content over a global reach media.

13. The method of claim 1, further comprising employing a priority logic and a queue technique if more than one recipient is simultaneously found in close proximity of the service terminal apparatus.

14. The method of claim 1, wherein the first part of the content is presented to a recipient via a publicly viewable service terminal, and said first part of the content informs the recipient that the second part of the content will only be viewable on a private service terminal.

15. The method according to claim 1, wherein the second part of the content comprises at least one of a pre-recorded interaction, a request for a live interaction, and a live interaction.

16. The method according to claim 1, wherein the second part of the content is presented to the recipient when the recipient makes particular gestures or facial reactions, or through speech recognition.

17. A service center apparatus for a communications system, wherein the service center apparatus is configured to:
receive identifying information on a recipient intended to receive content;
receive information identifying one or more service terminal apparatuses;
receive a content activation option which defines how said content will be presented to the recipient;
upload the content to the one or more assigned service terminal apparatuses; and
transmit the received identifying information to the one or more assigned service terminal apparatuses,
wherein the content in one of said service terminal apparatuses is activated when the recipient is within a predetermined proximity of the service terminal apparatus, whereby at least one of a personalized message and advertising content is presented to the recipient according to the selected content activation option,
wherein said content activation is an interactive content delivery, wherein the service terminal apparatus presents a first part of the content, waits for input from the identified recipient in the form of a specified change in movement, including slowing down, a body gesture, facial pattern, and/or voice acknowledgment, wherein upon receiving said input the service terminal apparatus presents a second part of the content.

18. The service center apparatus of claim 17 further configured to:
receive information on a location of a transmitter device of the recipient; and
transmit the information on the location of the transmitter device of the recipient to the same service terminal apparatus where the content was uploaded.

19. The service center apparatus of claim 17 further configured to:
receive a time schedule for presenting said content; and
transmit the received time schedule to the one or more assigned service terminals apparatuses.

20. The service center apparatus of claim 17 comprising a service center node capable of data management of electronic content and business logic support.

21. A service terminal apparatus for a communications system, wherein the service terminal apparatus is configured to:
upload a content based on an upload content service message received from a service center apparatus, said content comprising at least one of a personalized message and advertising;
receive a content activation option which defines how said content will be presented to the recipient;
receive information on a location of a transmitter device of a recipient intended to receive said content;
compare the received location information with location information of the service terminal apparatus; and
activate the content in the service terminal apparatus when the recipient is within a predetermined proximity of the service terminal apparatus, whereby at least one of the personalized message and advertising content is presented to the recipient on a monitor of the service terminal apparatus,
wherein said content activation is an interactive content delivery, wherein the service terminal apparatus presents a first part of the content, waits for input from the identified recipient in the form of a specified change in movement, including slowing down, a body gesture, facial pattern, and/or voice acknowledgment, wherein upon receiving said input the service terminal apparatus presents a second part of the content.

22. The service terminal apparatus of claim 21 further configured to receive information on a time schedule for presenting said content.

23. The service terminal apparatus of claim 21 further configured to transmit location data of the service terminal apparatus to the service center apparatus.

* * * * *